US008572485B2

(12) United States Patent
Smith et al.

(10) Patent No.: US 8,572,485 B2
(45) Date of Patent: Oct. 29, 2013

(54) SPLITTING AND MERGING ROUTING DOMAINS

(75) Inventors: Alexander Smith, Marietta, GA (US); Vagish Madrahalli, Woodstock, GA (US)

(73) Assignee: Ciena Corporation, Hanover, MD (US)

( * ) Notice: Subject to any disclaimer, the term of this patent is extended or adjusted under 35 U.S.C. 154(b) by 264 days.

(21) Appl. No.: 13/157,100

(22) Filed: Jun. 9, 2011

(65) Prior Publication Data

US 2012/0315037 A1    Dec. 13, 2012

(51) Int. Cl.
*G06F 3/00*     (2006.01)
(52) U.S. Cl.
USPC ........................................... 715/700
(58) Field of Classification Search
USPC .......................................... 715/700, 733, 734
See application file for complete search history.

(56) References Cited

U.S. PATENT DOCUMENTS

| 6,396,815 | B1* | 5/2002 | Greaves et al. | 370/256 |
| 6,542,511 | B1* | 4/2003 | Livermore et al. | 370/406 |
| 6,788,696 | B2* | 9/2004 | Allan et al. | 370/411 |
| 7,512,063 | B2* | 3/2009 | Vasseur et al. | 370/217 |
| 7,734,739 | B2* | 6/2010 | Natarajan et al. | 709/221 |
| 2005/0088965 | A1* | 4/2005 | Atlas et al. | 370/216 |
| 2008/0219272 | A1* | 9/2008 | Novello et al. | 370/401 |
| 2011/0007629 | A1* | 1/2011 | Atlas et al. | 370/225 |

\* cited by examiner

*Primary Examiner* — Fan Ng
(74) *Attorney, Agent, or Firm* — Muncy, Geissler, Olds & Lowe, PLLC

(57) ABSTRACT

Apparatuses and methods for merging multiple domains into a merged domain and splitting a single domain into multiple domains in an Automatically Switched Optical Network (ASON) are disclosed. For merging, a node in a first domain can be identified to be a new Routing Controller (RC) for the merged domain. A second domain can be identified to be merged with the first domain. Nodes, including old RCs, in the first domain and the second domain are notified of the identity of the new RC in the merged domain. The topology of the old RC's domain is sent to the new RC. The new topology is computed by the new RC from the topology information given by the old RCs. The updated topology is distributed to nodes in the merged domain via the new RC.

20 Claims, 11 Drawing Sheets

SPLITTING AND MERGING ROUTING DOMAINS

FIELD OF DISCLOSURE

This invention relates generally to communication systems and more specifically to control plane operations related to routing and switching connections in a network.

BACKGROUND

An Automatically Switched Optical Network (ASON) is a dynamic signaling-based network via a distributed control plane that provides auto-discovery and dynamic connection setup. This enables improved support for end-to-end provisioning, re-routing and restoration, new transport services such as bandwidth on demand, rapid service restoration for disaster recovery, and switch connection within a private network. ASON enables support for a wide range of narrowband and broadband client's signals (e.g., SDH/SONET, IP, Ethernet, ATM, Frame Relay, ESCON, FICON, Audio/Video).

ASON routing architecture is a network that is subdivided based on operator decision and criteria (e.g., geography, administration, and/or technology). The network subdivisions are defined in ASON as Routing Areas (RAs) or domains. The routing architecture and protocols applied after the network is subdivided are operator's choice. A multi-level hierarchy of RAs provides for a hierarchical relationship of RAs based on containment (i.e., child RAs are always contained within a parent RA). The hierarchical containment relationship of RAs provides for routing information abstraction, thereby enabling scalable routing information representation. Within an ASON domain and for each level of the routing hierarchy, multiple routing paradigms (hierarchical, step-by-step, source-based), centralized or distributed path computation, and multiple different routing protocols may be supported. The architecture does not assume a one-to-one correspondence between a routing protocol and an RA level, and allows the routing protocol(s) used within different RAs (including child and parent RAs) to be different. The routing adjacency topology and transport topology are not assumed to be congruent. The requirements support architectural evolution, such as change in the number of RA levels, as well as aggregation and segmentation of RAs.

The description of the ASON routing architecture provides for conceptual reference architectures, with definition of functional components and common information elements to enable end-to-end routing in the case of protocol heterogeneity and facilitate management of ASON networks. Various telecommunication companies have shown interest in building their networks using domains, wherein a domain is considered to be any collection of network elements within a common sphere of address management or path computation responsibility. The domains are built upon the ASON model where internal network to network interfaces (I-NM) are used within a domain or RA, and external network to network interfaces (E-NNI) are used to connect domains or RAs. Routing Controllers (RCs) are used to exchange topology information between domains, which may be as full or abstracted topologies. There are primary RCs and any number of nodes may be assigned as backup RCs (BRCS), usually there is only one backup RC per RA. PCEs (Path Computation Engines) may be used in conjunction with the RCs to provide path computation across multi-domains. In this disclosure, it is assumed that an RC function encompasses the function of a PCE as well. The RCs are initially manually configured by the operator and the IP addresses of the RCs in the other RAs are manually configured by the operator, referred to as the remote RCs.

Each network element within the domain is configured with the Node_ID of the RC and the Node_ID of the backup RC(s). This method is used to define a domain (i.e. the nodes associated with a particular RC belong to the same domain). By knowing the RC in the domain, each network element informs the RC of the Transport Network Assigned (TNA) address it supports via a message, which allows the RC to know all the TNAs reachable within its RA. This information is then shared with the other RA across the E-NNI either in a full or summarized fashion.

Manual splitting and manual merging of RAs within a network is known in the art. This known method for a manual reconfiguration one node at a time, may be traffic affecting. The manual method is time intensive and error prone. There is not an automatic and efficient method that enables a carrier to reconfigure RAs by merging two at a time or splitting one into two. In addition, the IETF or ITU-T standards have not standardized the splitting and merging of domains. Although the ITU-T has noted the problem and identified possible actions that can be performed, no method for the automatic merging or splitting of domains has been suggested.

SUMMARY

The described features generally relate to one or more improved systems, methods and/or apparatuses for merging or splitting domain(s) in an ASON network.

Further scope of the applicability of the described methods and apparatuses will become apparent from the following detailed description, claims, and drawings. The detailed description and specific examples, while indicating specific examples of the disclosure and claims, are given by way of illustration only, since various changes and modifications within the spirit and scope of the description will become apparent to those skilled in the art.

Accordingly an embodiment can include method for merging multiple domains in an Automatically Switched Optical Network (ASON) into a merged domain, the method comprising: identifying a new routing controller (RC) for the merged domain from a node in a first domain; identifying a second domain to be merged with the first domain; notifying nodes, including old RCs, in the first domain and the second domain of the new RC in the merged domain; sending old routing topology information from at least one of the old RCs' domain to the new RC; computing a new routing topology of the merged domain by the new RC from the old routing topology information sent from the old RCs; and distributing the new routing topology of the merged domain to nodes in the merged domain via the new RC.

Another embodiment can include a non-transitory computer readable storage medium containing instructions stored thereon, which, when executed by at least one processor cause the at least one processor to perform operations, the instructions comprising: instructions to identify a new routing controller (RC) for the merged domain from a node in a first domain; instructions to identify a second domain to be merged with the first domain; instructions to notify nodes, including old RCs, in the first domain and the second domain of the new RC in the merged domain; instructions to send old routing topology information from at least one of the old RCs' domain to the new RC; instructions to compute a new routing topology of the merged domain by the new RC from the old routing topology information sent from the old RCs; and instructions to distribute the new routing topology of the merged domain to nodes in the merged domain via the new RC.

Another embodiment can include a method for splitting a single domain in an Automatically Switched Optical Network (ASON) network into a first domain and a second domain, the method comprising: identifying a first node in the single domain to be a first routing controller (RC) in the first domain; identifying a second node in the single domain to be a second routing controller in the second domain; identifying internal network to network interface (I-NNI) links in the single domain to be promoted to external network to network interface (E-NNI) links between the first domain and the second domain; notifying nodes, including an old RC, in the single domain of an identity of the first RC in the first domain and an identity of the second RC in the second domain; sending an old routing topology of the single domain to the first RC in the first domain and the second RC in the second domain; computing a first domain routing topology by the first RC from the old routing topology and computing a second domain routing topology by the RC in the second domain from the old routing topology; and distributing updated routing topology to nodes in the first domain and the second domain via the first RC and the second RC.

Another embodiment can include a non-transitory computer readable storage medium containing instructions stored thereon, which, when executed by at least one processor cause the at least one processor to perform operations, the instructions comprising: instructions to identify a first node in the single domain to be a first routing controller (RC) in the first domain; instructions to identify a second node in the single domain to be a second routing controller in the second domain; instructions to identify internal network to network interface (I-NNI) links in the single domain to be promoted to external network to network interface (E-NNI) links between the first domain and the second domain; instructions to notify nodes, including an old RC, in the single domain of an identity of the first RC in the first domain and an identity of the second RC in the second domain; instructions to send an old routing topology of the single domain to the first RC in the first domain and the second RC in the second domain; instructions to compute a first domain routing topology by the first RC from the old routing topology and computing a second domain routing topology by the RC in the second domain from the old routing topology; and instructions to distribute updated routing topology to nodes in the first domain and the second domain via the first RC and the second RC.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
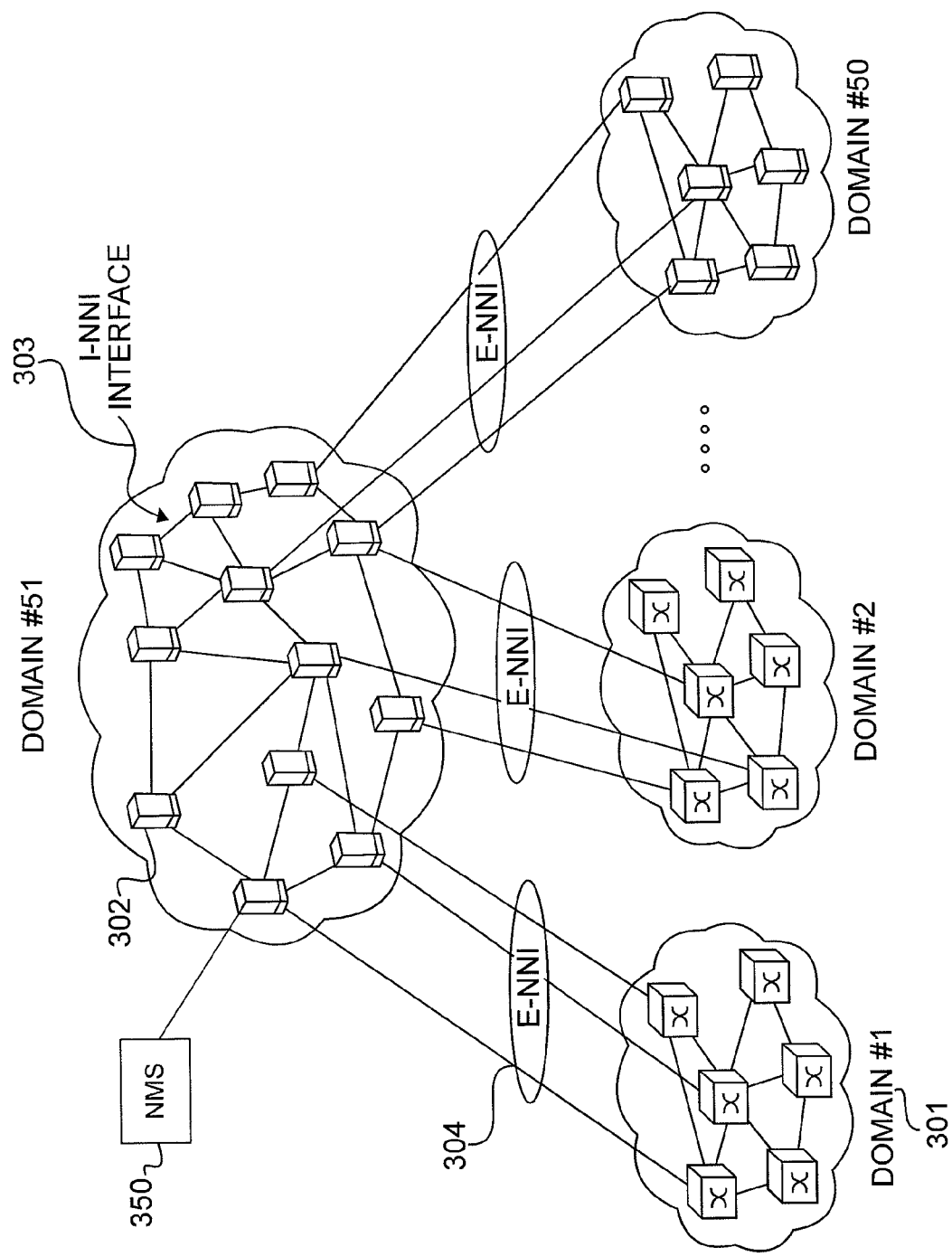
FIG. 1 is a simplified representation of a multi-domain model.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The present disclosure describes techniques for splitting and merging routing domains. In particular, the present disclosure describes automatically merging routing domains in an ASON network or automatically splitting routing domains in an ASON network, each of which address deficiencies discussed above in regard to conventional systems.

In one aspect, the Network Management System (NMS) may automatically merge two domains into one domain, without affecting traffic, by requesting the user to identify the two domains to merge and the new RC for the merged domain. The NMS also informs the old RCs of the domains to be merged that they are no longer RCs and are provided with the Node_ID of the new RC. However, this does not preclude an existing RC from being the RC of the merged domain.

In another aspect, NMS may automatically split one domain into two by requesting the user to pick the domain to be split and the new RCs of the split domains. User may identify the I-NNI links that are being converted to E-NNI links and the nodes that will function as RCs for the split domains.

Referring now to the drawings, FIG. 1 is an example of an ASON network in which the principles of the disclosure may be applied. An ASON network comprises of multiple domains 301, with each domain having multiple nodes 302. A node is connected to another node within the same domain via an I-NNI link 303. A node is connected to another node in another domain via an E-NNI link 304. A network management system (NMS) 350 is coupled to at least one node via communication link (e.g., Ethernet, optical, wireless, etc.) to allow for communication between NMS 350 and the various nodes or network elements in the network. The NMS 350 can include user one or more user interface (UI) devices, processors, communication interfaces, storage and the like as known in the art to provide end-to-end visibility of services across the various network transport and switching elements. The NMS 350 allows for management of the entire network and for UI commands to create the end-to-end service paths, which are discussed further in the following description. Since the NMS 350 does not have to be directly coupled to any specific node in the network, it will not be expressly illustrated in relation to the following merging and splitting illustrations.

Figure 2:
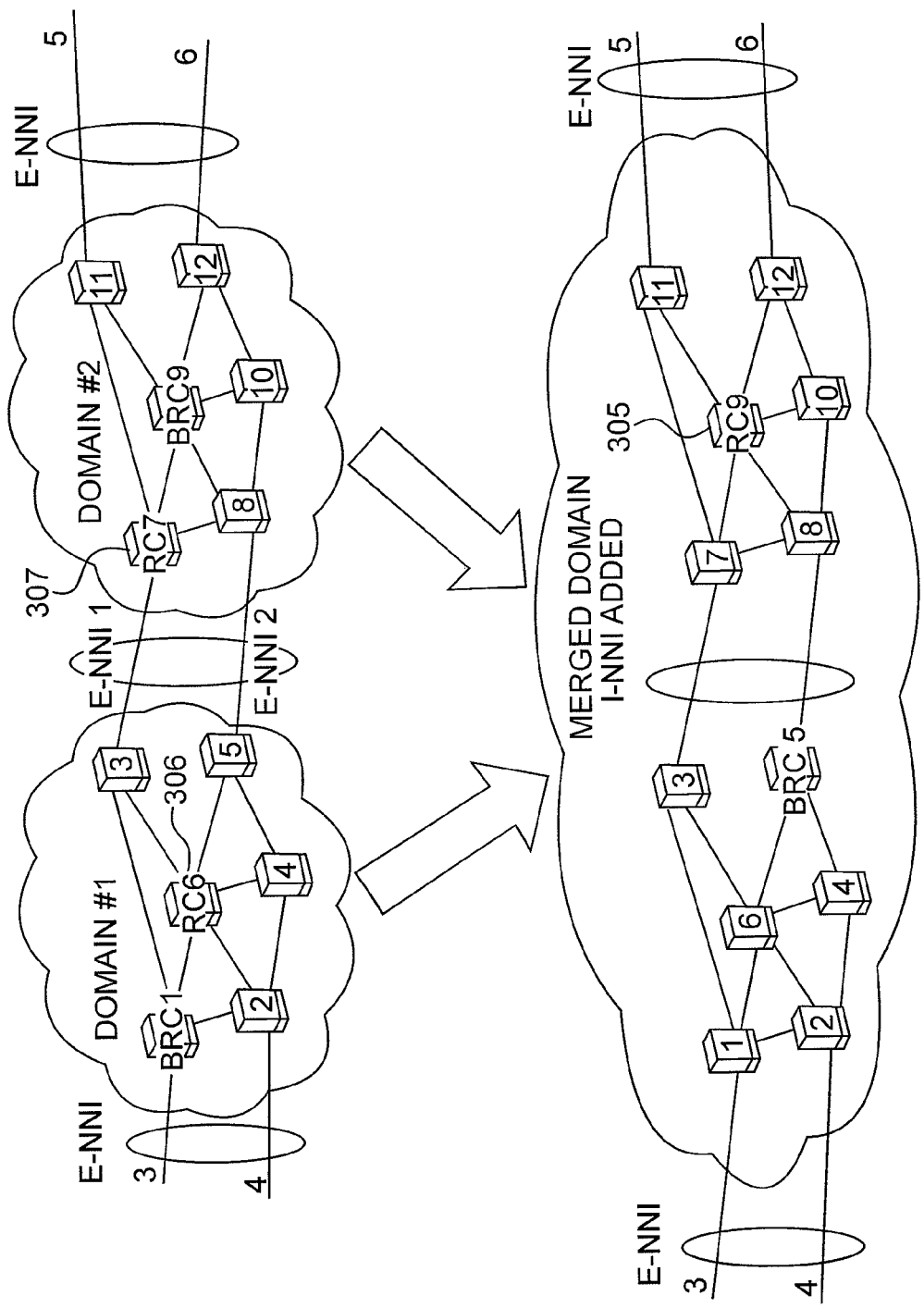
FIG. 2 is a diagram illustrating two domains merging into one domain.

FIG. 2 illustrates an example of merging two domains into one domain. The information used for merging domains can include labeling the node that will be the RC 305 of the merged domain. The new RC may be one of the old RCs from the two domains that are going to be merged. Alternatively a new RC may be selected that was not previously an RC. For example, the NMS may automatically inform the old RCs (e.g., 306 and 307) that they are no longer RCs. Additionally, the NMS provides the old RCs with the Node_ID of the new RC. Using various message exchanges, which can automatically occur, the nodes are informed of and can understand their roles and what domains they belong to. This may result in little or no impact in traffic flow, as discussed herein.

Figure 4:
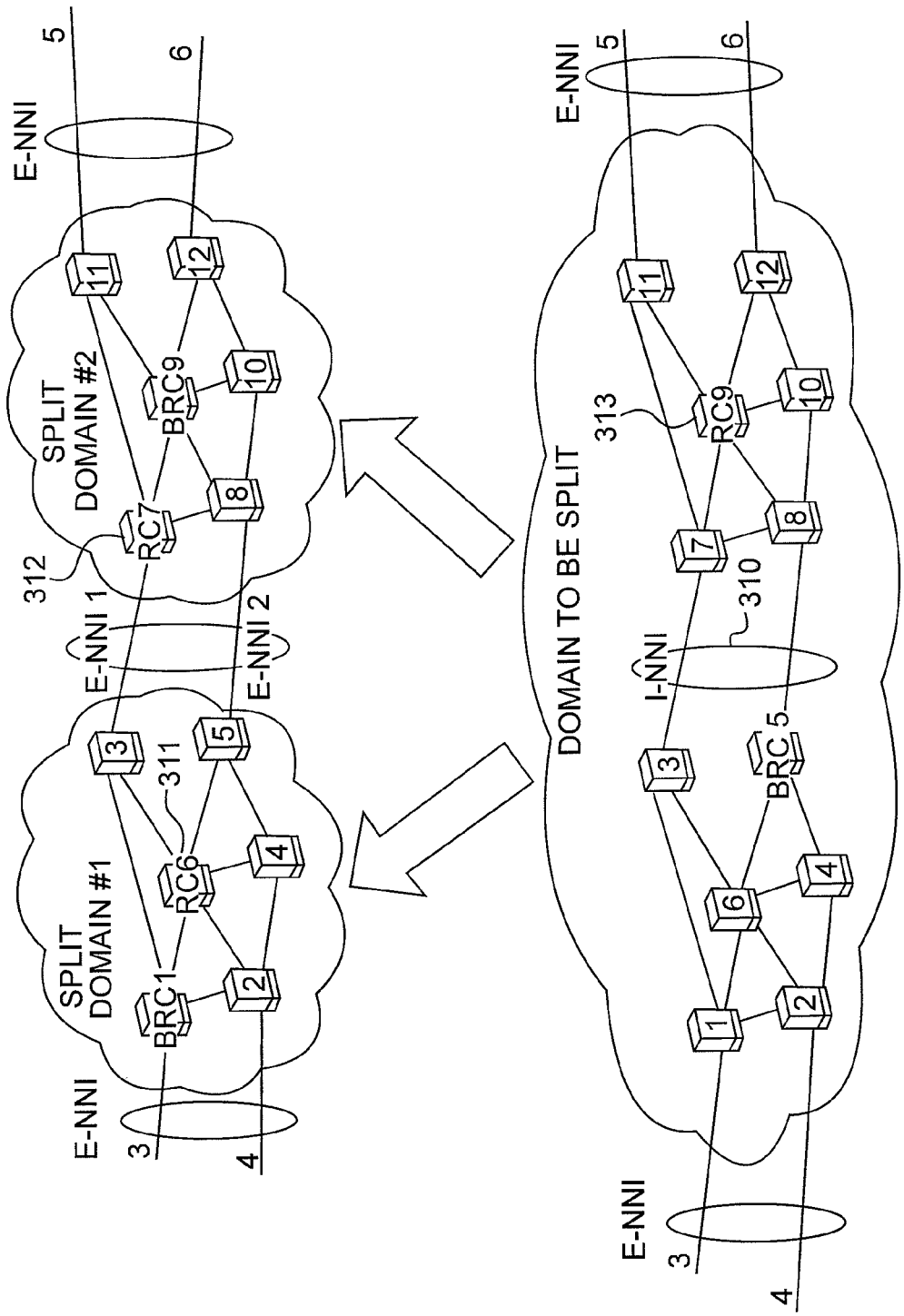
FIG. 4 is a diagram illustrating a domain splitting into two separate domains.

An example of splitting a domain into two domains is illustrated in FIG. 4. The information used for splitting a domain includes identifying the I-NNI links 310 that will be used as E-NNI links and the nodes that will function as RCs 311, 312 for the split domains. The NMS automatically informs the old RC 313 that they are no longer RCs. The NMS provides the old RC with the node_ID of the new RCs. Using various message exchanges, which can automatically occur, the nodes are informed of and can understand their roles and what domains they belong to. This may result in little or no impact in traffic flow, as discussed herein.

The merging and splitting process is performed between two domains at a time. To merge more than two domains, a user can select two adjacent domains and merge the domains, and then the merged domain can be selected and merged with another domain that is selected. This process can continue until all the desired domains are merged. Likewise, a domain can be split into two separate domains first, and then one or both of the split domains can be split again. The process can continue until all the desired domains have been split.

For merging domains, the user can identify the node that is to be the new RC. The new RC may be one of the previous RCs or a completely different node. Based on the input provided by the user, the new RC is notified from an NMS message that it will be the RC of a newly merged domain. Notification messages are also sent to the old RCs to notify them that they will no longer be RCs, and the Node_ID of the new RC is provided to old RCs as well. The nodes in the merged domain can then send messages to the new RC about their respective topologies and to the remote RCs that are currently adjacent to the nodes. The new RC constructs the topology of the merged domain based on messages received from the nodes. The new RC informs each node in the merged domain that it is the new RC of the merged domain. Each node then sends messages notifying the new RC of the TNA addresses supported. The merge process may be done with no manual intervention by the user other than the minimum information provided before triggering the merge. The common assignment of an RC node is a method to identify which domain a node belongs to. Therefore, all nodes in the new merged domain have the same RC and BRC. The merging and splitting function of domains can be performed while traffic is running, thus traffic is through the domains may not be impacted. I-NNI links may be added in support of the merging process, but existing I-NNI links should never be deleted. E-NNI links are not added or deleted. The user may add/delete E-NNI links after the domains have merged, as desired. The new RC and new BRC may be one of the previous RCs or BRCs, or they may be entirely new nodes, as there is no restriction on the node selected. E-NNI links may be demoted to I-NNI links after the merge process. If introducing hierarchy, the rules in one embodiment, are as follows: if the two domains are at the same level (N), the merged domain remain at that level (N); and if one domain is at a higher level (N+1), then the merged domain is at the higher level (N+1). The RCs represent a second level of hierarchy within the domain, since they speak on behalf of the domain.

For splitting a domain, two pieces of information are prompted by the NMS and provided by the user. First, the new RCs of the split domains are identified. Secondly, the I-NNI links are identified that divide the two new domains. These links are automatically configured as E-NNI links. The nodes that are the new RCs of the split domains obtain the full topology from the current RC, after the current RC is notified that it is no longer an RC. The current RC sends the full topology information of its domain to the new RCs. Using the full topology of the pre-split domain, and the I-NNI links that are to be used as the E-NNI links, each RC determines the nodes within its domain. TNA addresses are already known, and therefore do not need to be sent by the individual nodes. The final step is for the RCs to update all nodes that belong to its respective domain. The splitting process may be done with no manual intervention other than the information (i.e., the nodes to be the RCs and the I-NNI links that divide the new domains) provided by the user before the split operation is triggered. Splitting does not remove links, and may not affect traffic. The I-NNI links may be promoted to E-NNI links. The splitting of a domain into two domains may be done while traffic is running in the network. The I-NNI links that have been promoted to E-NNI links are used by each RC in the split domains to determine each domain's topology, using the full topology that was provided the RC of the pre-split domain. If introducing hierarchy, domains that are split remain at the same level (N) prior to the split.

As previously noted, FIG. 2 shows an example of two domains that are to be merged. As is known in the art, there is a network management system (NMS) that maintains a complete view of all the domains and nodes and interconnections between them. For clarity, FIG. 2 illustrates a piece of the overall network showing the two domains that the user requests to merge on the NMS. A hierarchical view of the domains can also be provided by the NMS, such that the domains can be collapsed into a single node with just the inputs into the domains shown or may be expanded to show the complete details of the nodes and interconnects within the domain simply by clicking on the collapsed domain. For example, if the overall network is collapsed with a view as a single node, it would be the highest level of the hierarchy.

The expanded view may look like domains 1 and 2 in FIG. 2. As illustrated, the current nodes that are the RC for each domain (e.g., routing controllers are shown as node 6 for domain 1 and node 7 for domain 2) and the nodes that are the BRCs for each domain (e.g., backup routing controllers are shown as node 1 in domain 1 and node 9 in domain 2). Initially, the domains are manually constructed one node at a time and the NMS has the view of the domains as the nodes are added/deleted. The NMS may provide function such as Merge and Split to perform the desired function. As the nodes are commissioned and deployed, the NMS builds the topology and also tracks the node names as assigned by the user, this ensures unique names are maintained across the whole network.

Figure 3A:
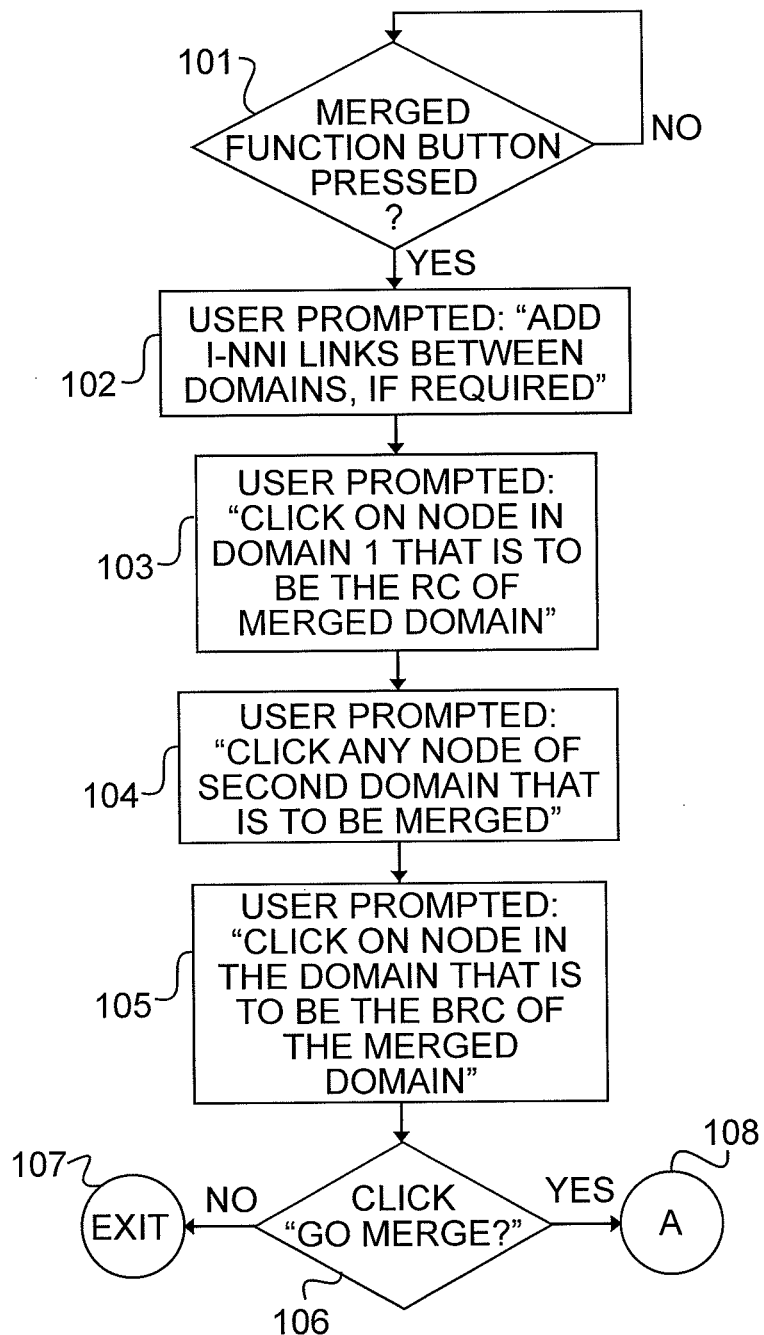
FIG. 3A is a flowchart illustrating a method of merging two routing domains into one domain.
Figure 3B:
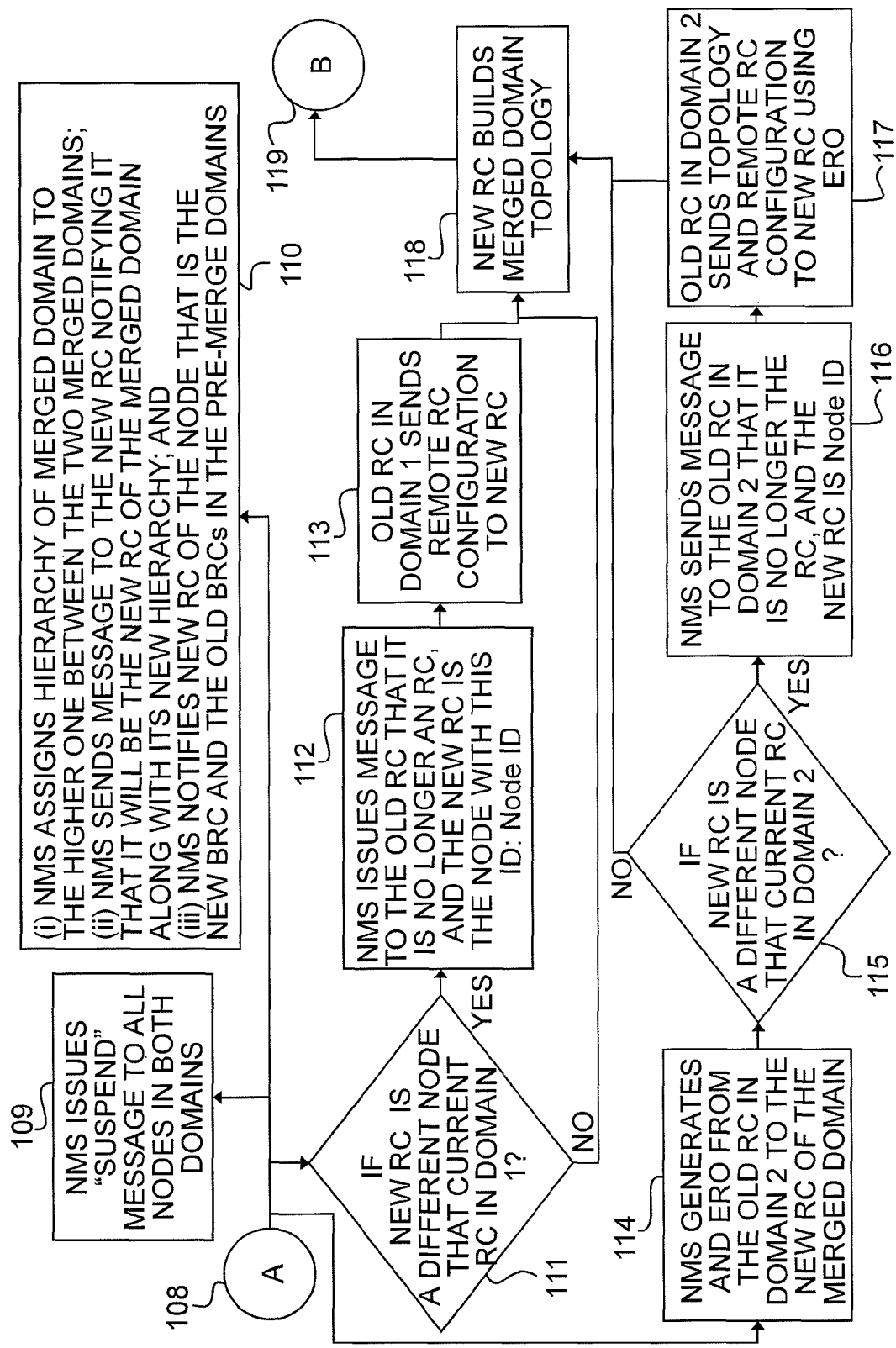
FIG. 3B is a flowchart illustrating a method of merging two routing domains into one domain, in continuation from FIG. 3A.
Figure 3C:
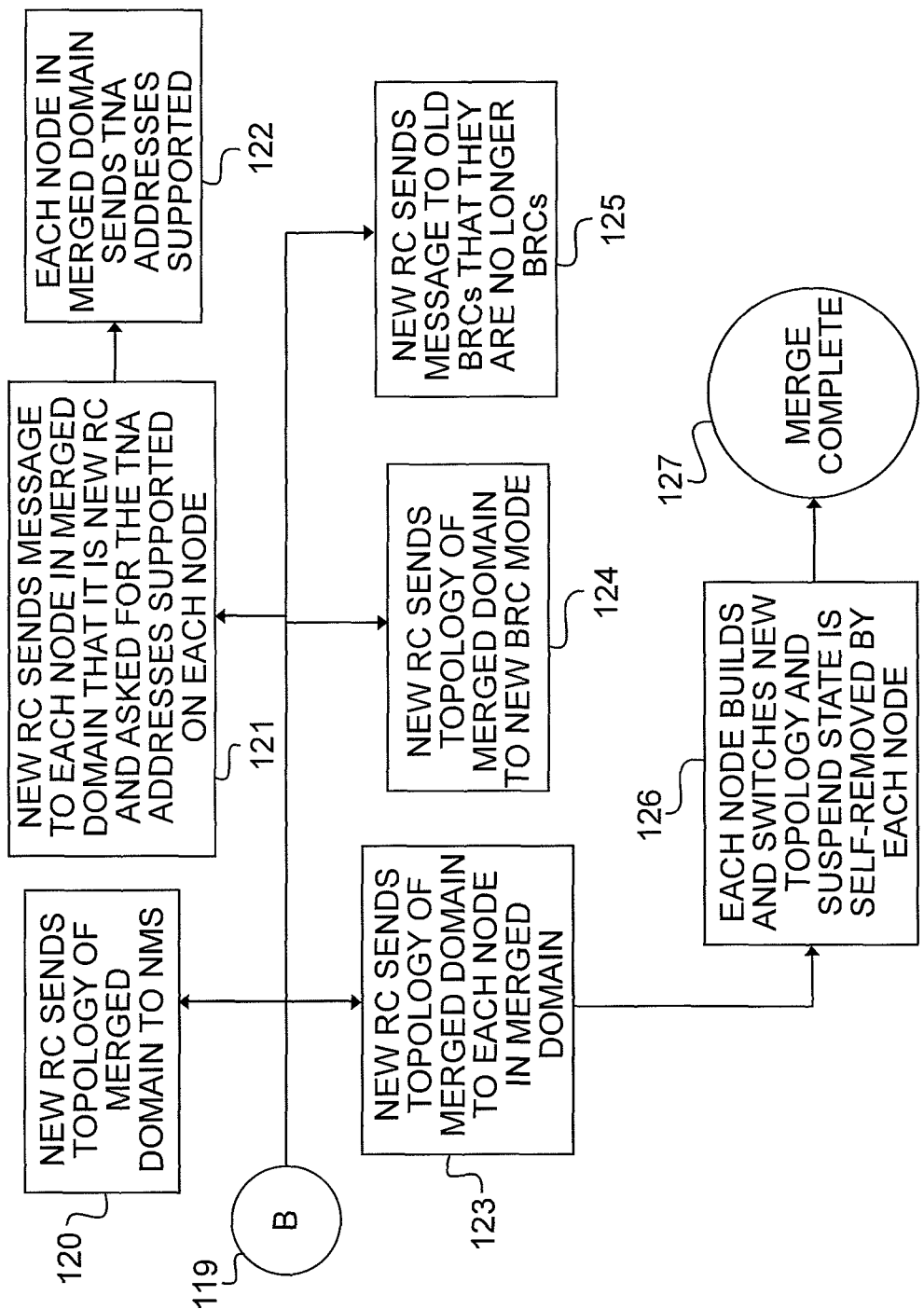
FIG. 3C is a flowchart illustrating a method of merging two routing domains into one domain, in continuation from FIG. 3B.

FIGS. 3A-3C illustrate an example of a merge process in accordance with the system shown in FIG. 2. As noted in the system illustrated in FIG. 2, the user desires to merge domains 1 and 2 by making the node 9 the RC and node 5 the BRC of the merged domain. This framework will be used in describing the following processes, but is provided merely for discussion and not limitation of the various embodiments of the invention.

The steps in FIG. 3A are triggered once a user requests the merge function (block 101). Once the merge function is requested, the NMS can prompt the user to add additional I-NNI links between domains, as they may be needed when no links exist between two domains that are to be merged (block 102). The links can be added by any technique, such as selecting two nodes to join via an I-NNI link. As shown in FIG. 2 some domains may not have I-NNI links between them. If I-NNI links do not exist, user may add links, if desired. It should be noted that until the merge is complete, no traffic runs through the new I-NNI links. Traffic may be kept off them by assigning a bandwidth of 0 to the I-NNI links. It may also be possible for user to not add I-NNI links, since there may already be I-NM links between the domains.

After any additional I-NNI links are added, the NMS may prompt the user to choose the new RC of the merged domain (block 103). Although the term "click on" is used, it will be appreciated that the selection can be done by any technique such as a selecting graphically via a mouse or similar pointer, keyboard command, etc. As a result of this action, two pieces of information are provided to the NMS: 1) the first domain that is going to be merged; and 2) the node that is to be the RC node of the merged domain.

In block 104, the NMS can prompt a user to identify a second domain to be merged by selecting any node in the second domain. The selection can be done by any technique such as a selecting graphically via a mouse or similar pointer, keyboard command, etc.

In block 105, the NMS can prompt a user to identify (e.g., click on) a node in one of the domains to be the BRC of the merged domain. From the previous topology, the NMS may know the BRCs of the first and second domains. However, the BRC of the merged domain may be any node and is not limited to one of the BRCs of the first and second domain.

In block 106 the NMS can prompt a user to confirm the merge. If user confirms the merge, then the merge commences (block 108). If the user does not confirm the merge, then the NMS exits the process and does not perform the merge (block 107).

After the merge is confirmed, the NMS may start the automatic process of merging the two domains. The NMS may trigger a suspend period and start the merge as illustrated in FIG. 3B. During the suspend period, path computation is halted or suspended except when restoration of connections must be done due to failed links/nodes occurring in the domain. Therefore no new connections are initiated and all incoming connections requested are rejected. All nodes in both domains continue to use the current topology view for restoration.

Since the NMS has all the information it needs (the two nodes to merge and the node that is to be the RC) to perform the merge, the NMS triggers the merge process to commence. Also, it will be appreciated from the following, that the first domain and second domain can be merged without forming an adjacency with the old RC in the second domain to obtain the topology of the old RC. The steps in block 109, 110, 111, and 114 can be done in a pipeline manner with 109 initiated first, 110 second, 111 third and 114 fourth.

In block 109, the NMS can issue a suspend message to all the nodes in both domains. During the suspend period, the nodes in both domains no longer perform path computation. No new connections are accepted and no new connections are initiated during the suspend period. The suspend period ends once the merge is complete. During the suspend period, each node uses the current topology view, which is the pre-merge view, to do any restorations. The suspend period is self lifted (self removed) by each node (see, e.g., block 126 of FIG. 3C), when the new topology of the merged domains is completed and each node has the new topology view. To facilitate an explanation of the process blocks from FIGS. 3B and 3C will be referred in the following section and reference to the nodes and domains of FIG. 2 will also be referred to without reference back to each specific figure to improve readability. Once again, the specific illustrations and text of each of the figures are merely provided to aid presenting and explaining the various embodiments and are not intended to limit the claimed embodiments to the specific illustrations provided.

In block 110, the NMS may assign the hierarchy of the merged domain to the value of the one that is higher between the two domains. The NMS sends a message to the new RC notifying it that it will be the RC of a merged domain along with the hierarchy of the merged domain. In the example in FIG. 2, node 9 in domain 2 is the new RC of the merged domain and would receive the notification message by the NMS. The NMS also can notify the new RC of the new BRC node (node 5) and the old BRC nodes (nodes 1 and 9). This is used later in block 124 to inform the new BRC (node 5) that it is the BRC along with the merged topology. The NMS also informs the old BRCs (nodes 1 and 9) that they are no longer BRCs in block 125.

In block 111, if the new RC is a different node than current RC in domain 1, then the NMS can issues message to the old RC notifying the old RC that it will no longer be an RC, and the new RC is the node with the ID: Node_ID (block 112) for the domain. In the example in FIG. 2, node 7 is the RC of domain 2. However, if the new RC is the same node as the current RC in domain 1, then the NMS may skip block 112 and block 113 and go directly to block 118.

The NMS provides an Explicit Route Object (ERO) (block 114), which is a path identifying the nodes and links, from the old RC (node 6) in the second domain to the new RC (node 9). In the example in FIG. 2, this is node 6 to the node 9 and the path would go through node 3 and node 7. If the new RC is a different node in block 115 than the current RC in domain 2, then the NMS can issue a message to the old RC 116 notifying it will no longer be an RC, and the new RC is the node with ID: Node_ID. If the new RC is the same node as the current RC in domain 1, then the NMS skips block 115 and block 116 and goes directly to block 118.

In addition, if the new and old RCs are different nodes, the old RC would inform the new RC of the current Remote RC configuration (block 113). Each node has the topology view of the current domain; therefore there is no need to send a topology view. The topology view of the other domain to be merged does need to be sent, which is performed in block 117.

Block 117 is triggered after block 116, if the new and old RCs are different nodes. The old RC in other domain (node 6) sends its topology view (block 117) and remote RC configuration to the new RC using the ERO provided in block 114.

After receiving the topology view from the other domain, the new RC (node 9 in FIG. 2) builds the topology of the merged domain, as shown in block 118. After block 118 is completed, the merge continues (block 119). The process is still under a suspend period and path computation is halted or suspended except for restoration. The new RC (node 9) sends the topology of the merged domain to the NMS (block 120). The NMS now has the updated merged topology view. The new RC (node 9) sends a message to each node in the merged domain notifying them that it is the new RC, and asks for the TNA addresses supported by each node (block 121).

Block 122 is triggered from block 121, where each node responds to the request, and sends the TNA addresses supported by each node to the new RC. In the example in FIG. 2 all of the nodes in the merged domain will send the TNA information to node 9. In block 123, the new RC (node 9) sends the topology of the merged domain to each node in the merged domain. In block 124, the new RC sends topology of merged domain to the BRC node (node 5). The BRC is identified in block 110. In block 125, new RC sends message to old BRCs (nodes 1 and 9) identified in block 110 that they are no longer BRCs. Triggered after block 123, as each nodes builds the topology after getting the topology from the new RC (node 9), each node discards the old topology. In block 126, each node also switches to the new topology and self-removes the suspend state imposed by the NMS in block 109.

The merge is now complete (block 127), and path computation is enabled once again, thus allowing new connections to be initiated or incoming connection requests to be accepted.

Figure 5A:
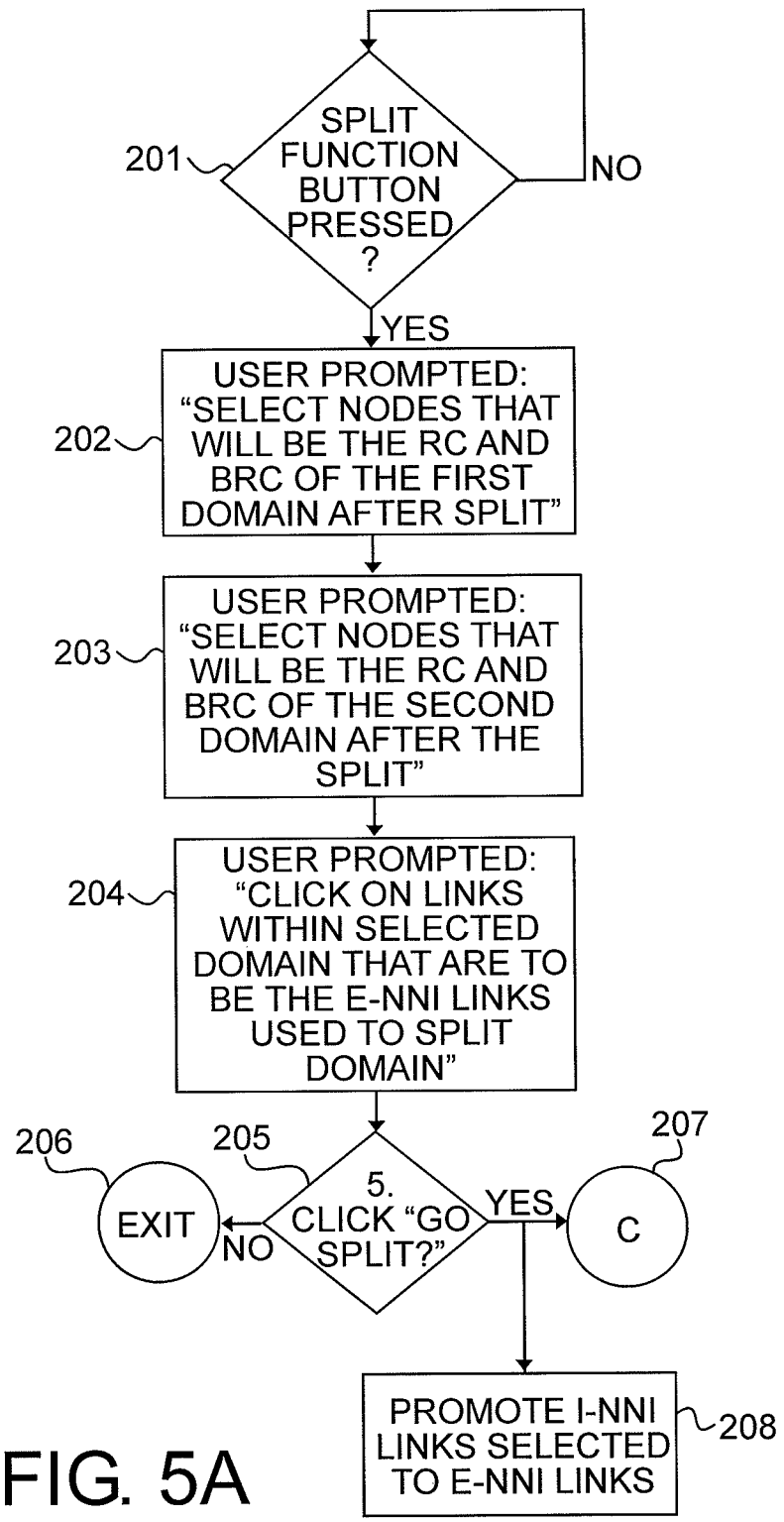
FIG. 5A is a flowchart illustrating a method of splitting a domain into two domains.
Figure 5B:
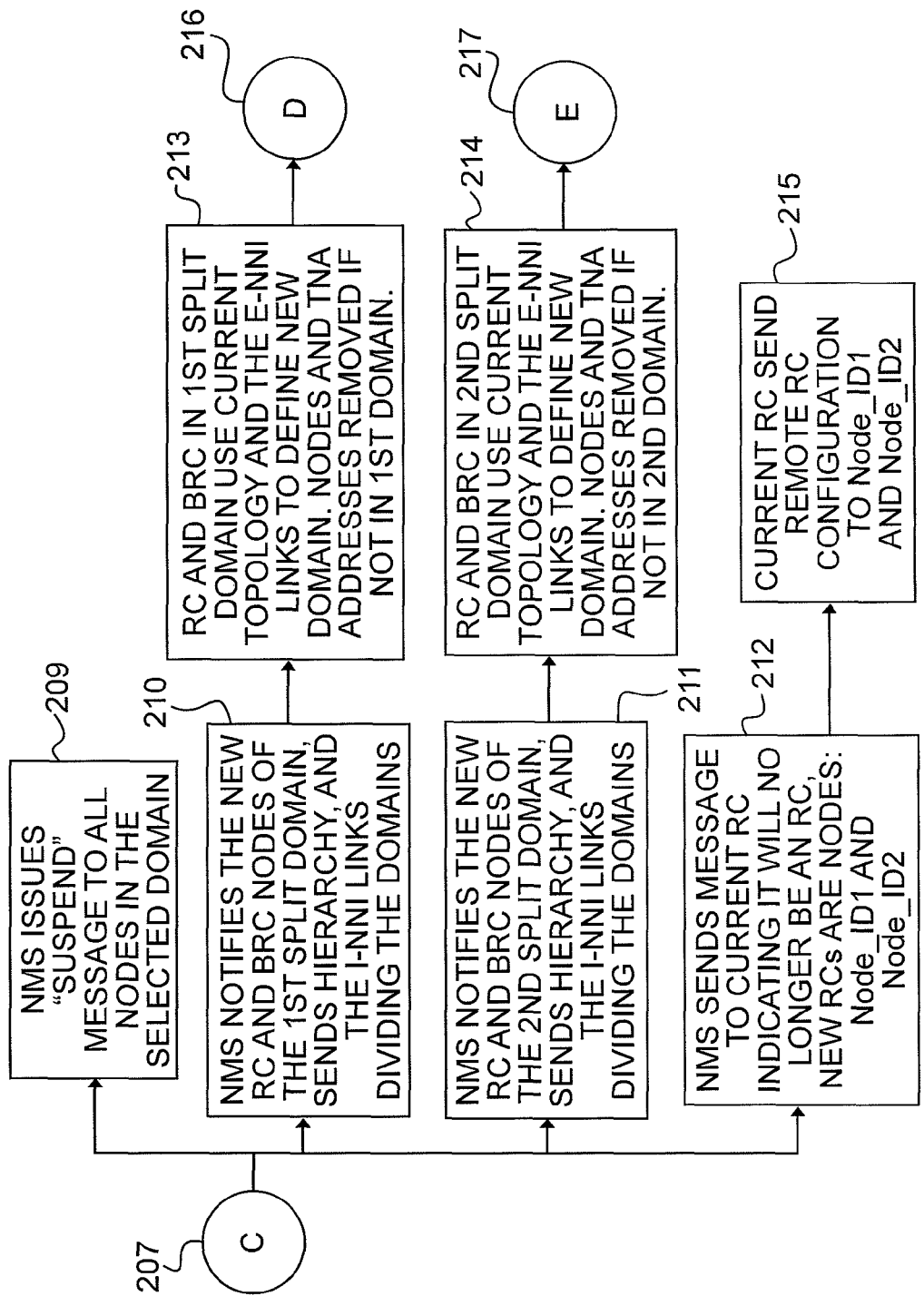
FIG. 5B is a flowchart illustrating a method of splitting a domain into two domains, in continuation from FIG. 5A.
Figure 5C:
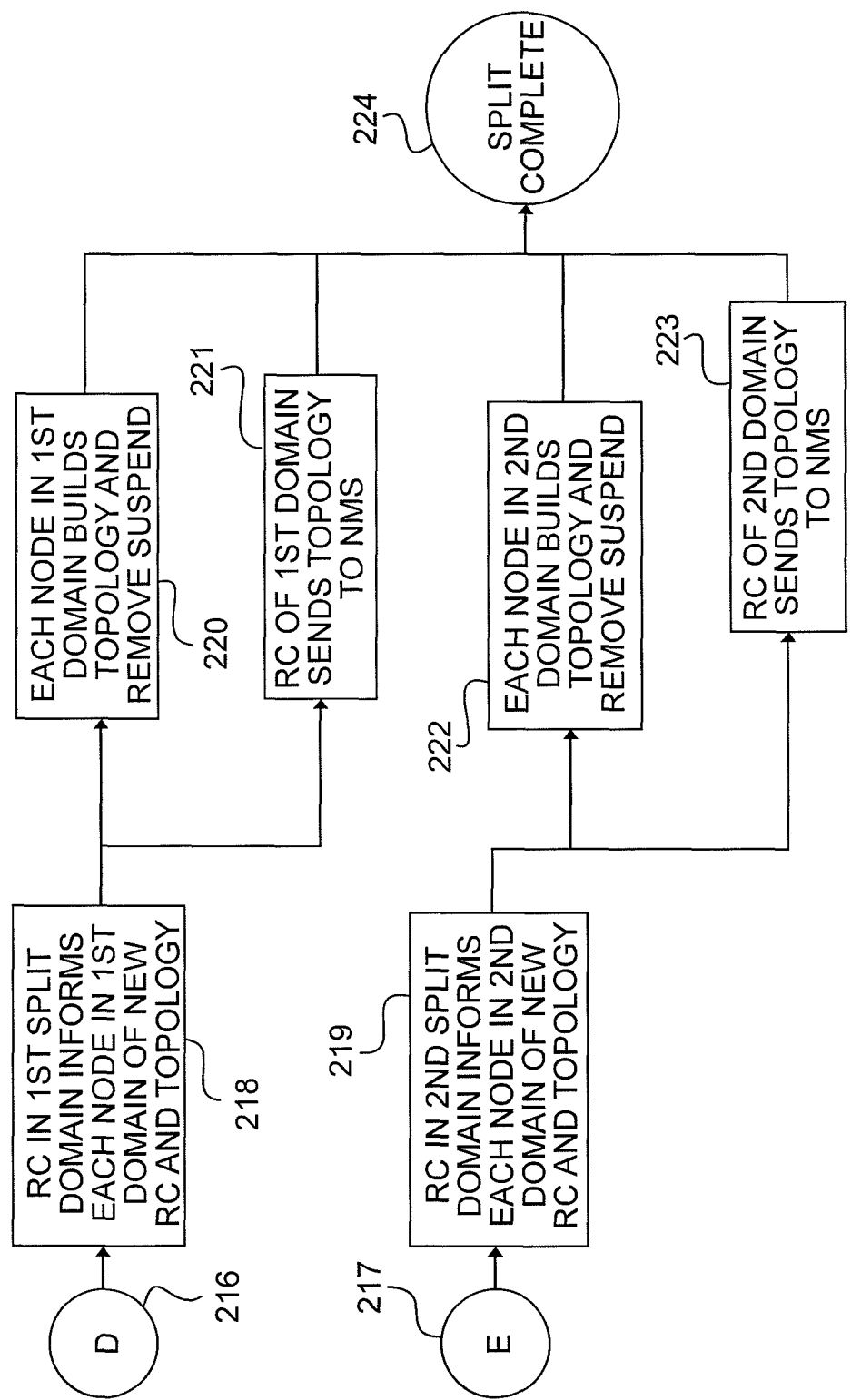
FIG. 5C is a flowchart illustrating a method of splitting a domain into two domains, in continuation from FIG. 5B.

FIGS. 5A-5C illustrates an example split process in accordance with embodiments of the invention and makes reference to the topology shown in FIG. 4. As shown in FIG. 4, a user desires to split a domain by making node 6 the RC and node 1 the BRC of the first split domain, and making node 7 the RC and node 9 the BRC of the second split domain.

The steps in FIG. 5A are triggered once user requests the split function as shown in block 201. Once split function is requested, the NMS may prompt user to identify the new RC and BRC of the first domain after split (block 202). The selection can be done by any technique such as a selecting graphically via a mouse or similar pointer, keyboard command, etc. As a result of this action, three pieces of information are provided to the NMS: 1) the first domain that is going to be split; 2) the node that is to be the RC node of the first domain; and 3) the node that is to be the BRC node of the first domain.

In block 203, the NMS can prompt a user to identify new RC and BRC of the second domain after split to identify a second domain. Once again, the selection can be done by any technique such as a selecting graphically via a mouse or similar pointer, keyboard command, etc.

In block 204 the NMS can prompt a user to identify links within selected domain to be split that are going to be E-NNI links used in the split domains. The links can be identified by any technique such as selecting an I-NNI link to be promoted to an E-NNI link (block 208). Traffic between the selected links does not need to be disturbed since the links existed before the split.

In block 205 the NMS can prompt a user to confirm the split. If user confirms the split, then the split may commence (block 207). If the user does not confirm the merge, then the NMS exits the process and does not do the split (block 206).

After the split is confirmed, the NMS may start the automatic process of splitting the domain into two smaller domains. The NMS may triggers the suspend period and starts the split as illustrated in FIG. 5B. During the suspend period, path computation is halted or suspended except for restoration. Therefore no new connections are initiated and all incoming connections requested are rejected. All nodes in the domain continue to use the current topology view for restoration.

Since the NMS has all the information it needs (the I-NNI links that will now be used as E-NNI links and the nodes that will function as RCs for the split domains) to perform the split, the NMS triggers the split process to commence. The steps in block 209, 210, 211, and 212 are done in a pipeline manner with 209 initiated first, 210 second, 211 third and 212 fourth. To facilitate an explanation of the process blocks from FIGS. 5B and 5C will be referred in the following section and reference to the nodes and domains of FIG. 4 will also be referred to without reference back to each specific figure to improve readability. Once again, the specific illustrations and text of each of the figures are merely provided to aid presenting and explaining the various embodiments and are not intended to limit the claimed embodiments to the specific illustrations provided.

In block 209, the NMS can issue a suspend message to all the nodes in the domain. During the suspend period, the nodes in the domain no longer do path computation. No new connections are accepted and no new connections are initiated during the suspend period. The suspend period ends once the split is complete. During the suspend period, each node uses the current topology view, which is the pre-split view, to do any restorations. The suspend period is self lifted by each node in block 220 and 222, when the new topology of the first and second split domains is completed and each node has the new topology.

In block 210, the NMS may send a notification to the new RC and BRC of the first split domain, along with the hierarchy and the I-NNI links (310 of FIG. 4) dividing the domains. The new RC (node 6) and BRC (node 1) of the first split domain are informed of their new role and create a new topology. In the example in FIG. 4, node 6 in the first split domain is the new RC and receives notification message by the NMS. In the example in FIG. 4, node 1 in the first domain is the new BRC and receives notification message by the NMS. The NMS also can notify the old RC (node 9) of the new RC node. The NMS also informs the old BRC (node 5) that it is no longer a BRC in block 212.

In block 211, the NMS may send a notification to the new RC (node 7) and BRC (node 9) of the second split domain, along with the hierarchy and the I-NNI links (310) dividing the domains. The new RC and BRC of the second split node are informed of new role and create new topology. In the example in FIG. 4, node 7 in the second domain is the new RC and receives notification message by the NMS. In the example in FIG. 4, node 9 in the second domain is the new BRC and receives notification message by the NMS.

In block 212, the NMS may notify the current RC (node 9) that it is no longer an RC. The notification can occur by any technique such as the NMS sending the RC node a message in a packet. The NMS can issue a message to the current RC (node 9) notifying it of the new RCs in the first and second domain with ID: Node_ID1 and Node_ID2. In the example in FIG. 4, node 6 is the RC of the first domain and node 7 is the RC of the second split domain. In block 215, the current RC (node 9) can send RC configuration to Node_ID1 and Node_ID2, in order for the new RCs to develop the topology of the first and second split domains. With the RC configuration information, the RC (node 6) and BRC (node 1) in the first split domain use current topology and the E-NNI links (E-NNI 1 and E-NNI 2) to define the first domain (block 213). Nodes and TNA addresses are removed, if not in the first split domain. With the RC configuration information, the RC (node 7) and BRC (node 9) in the second split domain also use current topology and the E-NNI links (E-NNI 1 and E-NNI 2) to define the second domain. Nodes and TNA addresses are removed if not in the second split domain (block 214).

The splitting process continues in FIG. 5C, as shown in blocks 218 and 219. In block 218, the RC (node 6) in the first split domain notifies all the nodes in the first split domain of the new RC (node 6) and the new topology. The notification can occur by any technique, such as the RC node sending a message in a packet to every node in the first split domain. As a result, each node in the first split domain builds a topology. As each node builds the topology after getting the topology from the new RC, each node discards the old topology. Each node also switches to the new topology and self-removes the suspend state imposed by the NMS (block 220). The RC (node 6) in the first split domain also sends the topology to the NMS before the split is complete (block 221). The new RC (node 6) sends a message to each node in the first domain notifying them that it is the new RC, and informing all the nodes of the topology.

In block 217, the RC (node 7) in the second split domain notifies all the nodes in the second split domain of the new RC (node 7) and the new topology. The notification can occur by any technique, such as the RC node sending a message in a packet to every node in the second split domain. As a result, each node in the second split domain builds a topology. As each node builds the topology after getting the topology from the new RC, each node discards the old topology. Each node also switches to the new topology and self-removes the suspend state imposed by the NMS (block 222). The RC (node 7) in the second split domain also sends the topology to the NMS before the split is complete. (block 223). The new RC (node 7 in FIG. 4) sends a message to each node in the second split domain notifying them that it is the RC for the second split domain, and informing all the nodes of the topology. The NMS now has the updated split topology view.

The split is now complete (block 224), and path computation is enabled once again, thus allowing new connections to be initiated.

Figure 6:
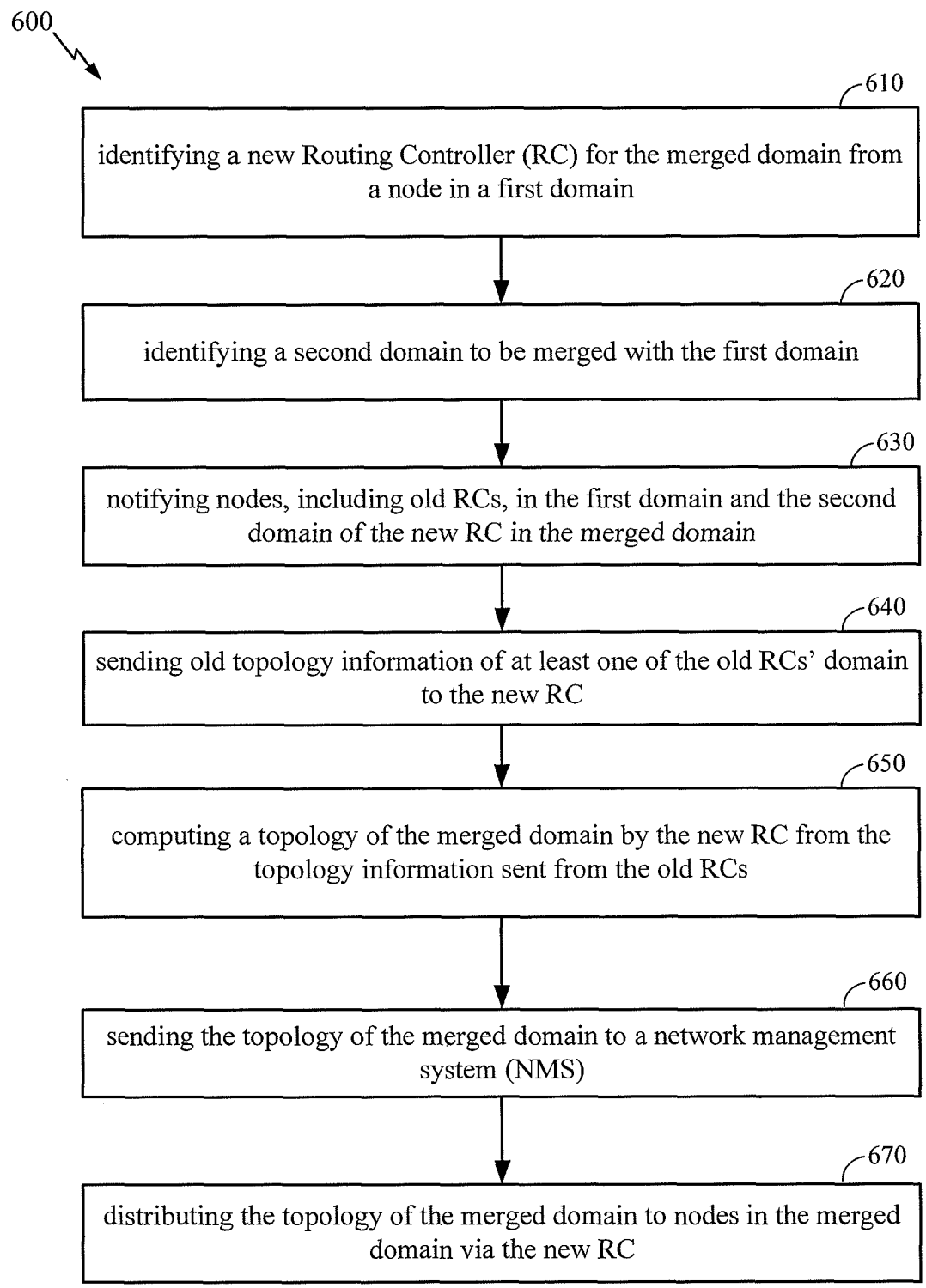
FIG. 6 is a flowchart illustrating a method for merging two domains.

In view of the foregoing disclosure, it will be appreciated that embodiments of the invention include various aspects of the foregoing sequence of actions, steps, algorithms and/or functionalities. Accordingly, FIG. 6 is a flowchart illustrating a method for merging multiple domains in accordance with at least one embodiment. The method 600 can include identifying a new Routing Controller (RC) for the merged domain from a node in a first domain (block 610). A second domain to be merged with the first domain can be identified (block 620). Nodes, including old RCs, in the first domain and the second domain can be notified of the new RC in the merged domain (block 630). The old topology information of at least one of the old RCs' domain (both if the new RC is not an old RC) can be sent to the new RC (block 640). A topology of the merged domain can be computed by the new RC from the topology information sent from the old RCs (block 650). The topology of the merged domain can be optionally sent to a network management system (NMS) (block 660) and can be distributed to nodes in the merged domain via the new RC (block 670). It will be appreciated that additional actions, steps or functionalities may be added without departing from the various embodiments of the invention.

Figure 7:
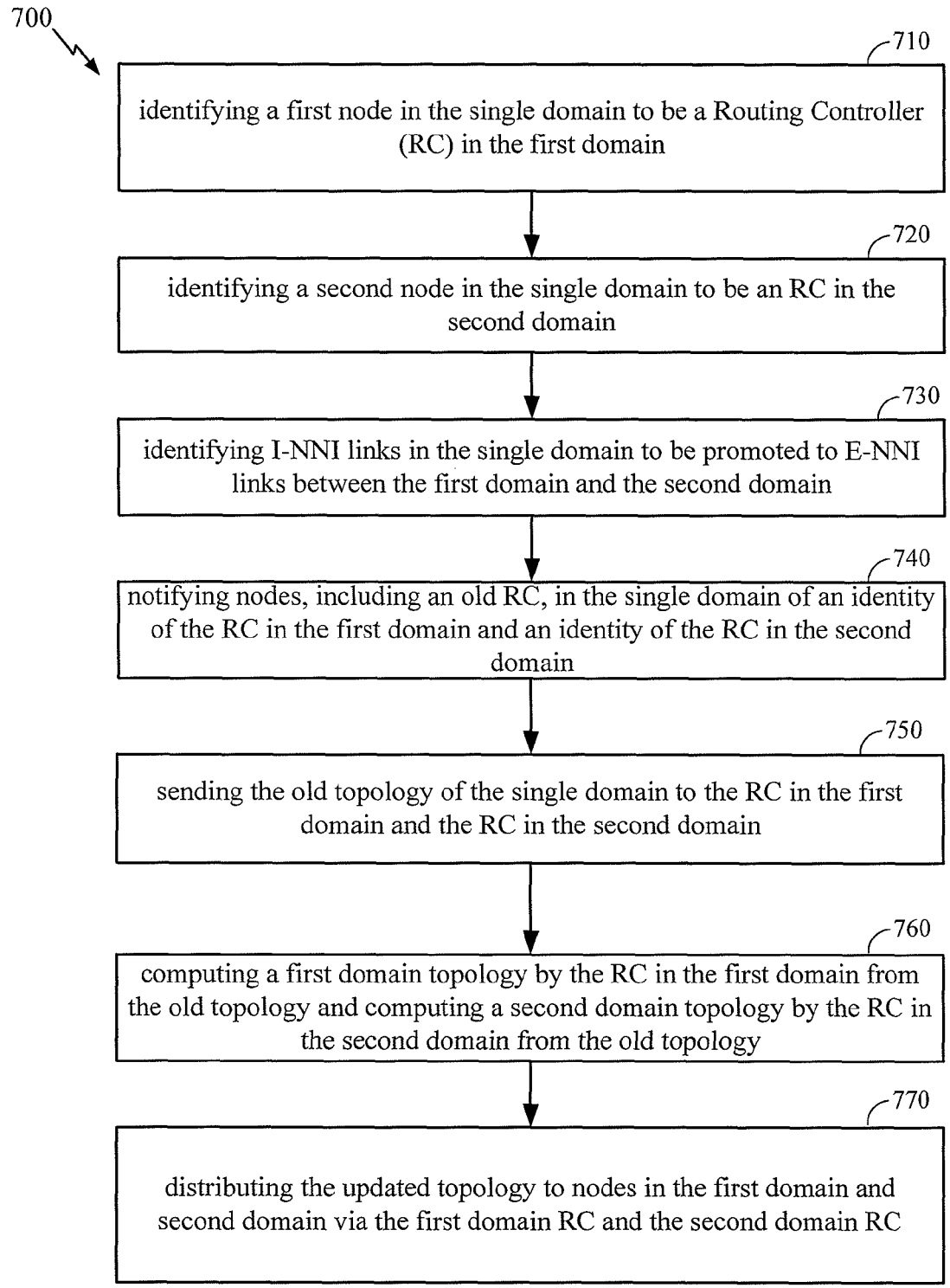
FIG. 7 is a flowchart illustrating a method for splitting a single domain into multiple domains.

Additionally, in view of the foregoing disclosure, it will be appreciated that embodiments of the invention include various aspects of the foregoing sequence of actions, steps, algorithms and/or functionalities for splitting domains. Accordingly, FIG. 7 is a flowchart illustrating a method 700 for splitting a single domain in accordance with at least one embodiment. The method can include identifying a first node in the single domain to be a Routing Controller (RC) in the first domain (block 710). A second node in the single domain to be an RC in the second domain can be identified (block 720). I-NNI links in the single domain to be promoted to E-NNI links between the first domain and the second domain can be identified (block 730). Nodes, including an old RC, in the single domain can be notified of an identity of the RC in the first domain and an identity of the RC in the second domain (block 740). The old topology of the single domain can be sent to the RC in the first domain and the RC in the second domain (block 750). A first domain topology can be computed by the RC in the first domain from the old topology and a second domain topology can be computed by the RC in the second domain from the old topology (block 760). An updated topology of the first domain and second domain can be distributed to nodes in the first domain and second domain via the first domain RC and the second domain RC (block 770).

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Accordingly, as noted in the foregoing, embodiments may be implemented as "logic configured to" perform the various functions described herein. Further, it will be appreciated that the logic may be implemented on or comprise one or more devices that are operably coupled and work cooperatively to perform the functions described. Accordingly, the arrangement and elements of various illustrations contained herein should not be construed as limiting the various embodiments.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for merging and/or splitting routing domains. Accordingly, the invention is not limited to illustrated examples and any means for performing the functionality described herein are included in embodiments of the invention.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for merging multiple domains in an Automatically Switched Optical Network (ASON) into a merged domain, the method comprising:
   identifying a new routing controller (RC) for the merged domain from a node in a first domain;
   identifying a second domain to be merged with the first domain;
   notifying nodes, including old RCs, in the first domain and the second domain of the new RC in the merged domain;
   sending old routing topology information from at least one of the old RCs' domain to the new RC;
   computing a new routing topology of the merged domain by the new RC from the old routing topology information sent from the old RCs; and
   distributing the new routing topology of the merged domain to nodes in the merged domain via the new RC.

2. The method of claim 1, further comprising:
   sending the new routing topology of the merged domain to a network management system (NMS).

3. The method of claim 2, wherein merging the first domain and second domain further comprises:
   sending an explicit route object (ERO) from the NMS to at least one old RC, the at least one old RC knows the node that is the new RC of the merged domain and can send its topology to the new RC of the merged domain.

4. The method of claim 1, wherein the new RC is not the old RC of the first domain.

5. The method of claim 4, wherein sending the old routing topology information comprises:
sending the old routing topology information from both of the old RCs of the first domain and the second domain.

6. The method of claim 1, further comprising:
   sending Transport Network Assigned (TNA) addresses supported from nodes in the merged domain to the new RC.

7. The method of claim 1, further comprising:
   sending a suspend message to nodes in the first domain and the second domain to suspend path computation.

8. The method of claim 7, further comprising:
   removing the suspend path computation by each node in the merged domain, after the new routing topology of the merged domain is received.

9. The method of claim 1, further comprising:
   establishing a hierarchy of the merged domain, wherein the hierarchy assumes a level equal to a highest level between the first domain and the second domain.

10. The method of claim 1, wherein merging the first domain and second domain is performed without forming an adjacency with the old RC in the second domain to obtain the topology from the old RC.

11. The method of claim 1, further comprising:
    identifying external network to network interface (E-NNI) links between the first domain and the second domain; and
    converting the external network to network interface (E-NNI) links to internal network to network interface (I-NNI) links.

12. The method of claim 1, further comprising:
    establishing a new backup routing controller (BRC) from a node in the first domain or second domain; and
    communicating to old backup routing controllers of the first domain and the second domain that they are no longer backup routing controllers.

13. A non-transitory computer readable storage medium containing instructions stored thereon, which, when executed by at least one processor cause the at least one processor to perform operations, the instructions comprising:
    instructions to identify a new routing controller (RC) for the merged domain from a node in a first domain;
    instructions to identify a second domain to be merged with the first domain;
    instructions to notify nodes, including old RCs, in the first domain and the second domain of the new RC in the merged domain;
    instructions to send old routing topology information from at least one of the old RCs' domain to the new RC;
    instructions to compute a new routing topology of the merged domain by the new RC from the old routing topology information sent from the old RCs; and
    instructions to distribute the new routing topology of the merged domain to nodes in the merged domain via the new RC.

14. A method for splitting a single domain in an Automatically Switched Optical Network (ASON) network into a first domain and a second domain, the method comprising:
    identifying a first node in the single domain to be a first routing controller (RC) in the first domain;
    identifying a second node in the single domain to be a second routing controller in the second domain;
    identifying internal network to network interface (I-NNI) links in the single domain to be promoted to external network to network interface (E-NNI) links between the first domain and the second domain;
    notifying nodes, including an old RC, in the single domain of an identity of the first RC in the first domain and an identity of the second RC in the second domain;

sending an old routing topology of the single domain to the first RC in the first domain and the second RC in the second domain;

computing a first domain routing topology by the first RC from the old routing topology and computing a second domain routing topology by the RC in the second domain from the old routing topology; and distributing updated routing topology to nodes in the first domain and the second domain via the first RC and the second RC.

15. The method of claim 14, further comprising:

sending the updated routing topology of the first domain and the second domain to a network management system (NMS).

16. The method of claim 14 further comprising:

sending transport network assigned (TNA) addresses supported from the nodes in the first and the second domains to the first RC and second RC.

17. The method of claim 14, further comprising:

suspending path computation in the nodes in the single domain.

18. The method of claim 14, further comprising:

identifying a third node in the single domain to be a first backup routing controller in the first domain; and identifying a fourth node in the single domain to be a second backup routing controller in the second domain.

19. The method of claim 18, further comprising:

removing the suspend path computation by each node in the first domain and second domains, once the updated routing topology is received by each node.

20. A non-transitory computer readable storage medium containing instructions stored thereon, which, when executed by at least one processor cause the at least one processor to perform operations, the instructions comprising:

instructions to identify a first node in the single domain to be a first routing controller (RC) in the first domain;

instructions to identify a second node in the single domain to be a second routing controller in the second domain;

instructions to identify internal network to network interface (I-NNI) links in the single domain to be promoted to external network to network interface (E-NNI) links between the first domain and the second domain;

instructions to notify nodes, including an old RC, in the single domain of an identity of the first RC in the first domain and an identity of the second RC in the second domain;

instructions to send an old routing topology of the single domain to the first RC in the first domain and the second RC in the second domain;

instructions to compute a first domain routing topology by the first RC from the old routing topology and computing a second domain routing topology by the RC in the second domain from the old routing topology; and instructions to distribute updated routing topology to nodes in the first domain and the second domain via the first RC and the second RC.

* * * * *